US008378528B2

(12) United States Patent
Jang et al.

(10) Patent No.: US 8,378,528 B2
(45) Date of Patent: Feb. 19, 2013

(54) SYSTEMS AND METHODS FOR DISCHARGING BUS VOLTAGE USING SEMICONDUCTOR DEVICES

(75) Inventors: Seok-Joo Jang, Irvine, CA (US); David Tang, Fontana, CA (US); Constantin C. Stancu, Anaheim, CA (US); Ronald W. Young, Whittier, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 236 days.

(21) Appl. No.: 12/632,050

(22) Filed: Dec. 7, 2009

(65) Prior Publication Data

US 2011/0133546 A1   Jun. 9, 2011

(51) Int. Cl.
*H01H 9/30* (2006.01)
(52) U.S. Cl. ...................................... 307/135; 307/10.1
(58) Field of Classification Search .................. 307/10.1, 307/135, 116, 117; 320/135
See application file for complete search history.

(56) References Cited

U.S. PATENT DOCUMENTS

| | | | |
|---|---|---|---|
| 5,708,347 A | 1/1998 | Palanisamy et al. | |
| 5,804,973 A | 9/1998 | Shinohara et al. | |
| 5,812,003 A | 9/1998 | Lee | |
| 6,002,221 A | 12/1999 | Ochiai et al. | |
| 6,437,575 B1 | 8/2002 | Lin et al. | |
| 6,452,416 B1 | 9/2002 | Kaneda et al. | |
| 6,577,024 B2 | 6/2003 | Kikuta et al. | |
| 7,057,361 B2 * | 6/2006 | Kitahata et al. | 318/139 |
| 7,327,053 B2 | 2/2008 | Eckardt et al. | |
| 7,375,985 B2 | 5/2008 | Wai et al. | |
| 7,723,949 B2 | 5/2010 | Nakashima et al. | |
| 7,764,067 B2 | 7/2010 | Lindsey | |
| 8,022,569 B2 * | 9/2011 | Chen et al. | 307/10.1 |
| 8,039,993 B2 | 10/2011 | Kaplan | |
| 2007/0247115 A1 | 10/2007 | Ishikawa et al. | |
| 2009/0268354 A1 | 10/2009 | Kaplan | |
| 2011/0133546 A1 | 6/2011 | Jang et al. | |

FOREIGN PATENT DOCUMENTS

| | | |
|---|---|---|
| DE | 69117006 T2 | 9/1996 |
| DE | 10063084 A1 | 7/2002 |
| JP | 2007312456 A | 11/2007 |

OTHER PUBLICATIONS

Chen, K., et al. "Systems and Methods for Discharging Bus Voltage Using Semiconductor Devices ," U.S. Appl. No. 12/256,808, filed Oct. 23, 2008.
German Office Action, dated Nov. 24, 2010, for German Application 10 2009 049 977.6.
German Office Action, dated Jul. 26, 2010, issued in German Application No. 10 2009 001 032.
U.S. Office Action, dated Oct. 30, 2012, for U.S. Appl. No. 13/243,990.

* cited by examiner

*Primary Examiner* — Jared Fureman
*Assistant Examiner* — Carlos Amaya
(74) *Attorney, Agent, or Firm* — Ingrassia Fisher & Lorenz, P.C.

(57) ABSTRACT

Systems and methods are provided for discharging a voltage bus. An electrical system comprises a first switch coupled to a first voltage rail, a second switch coupled between the first switch and a second voltage rail, and a control system coupled to the first switch and the second switch. The control system is configured to alternately activate the first switch and the second switch such that an energy potential between the first voltage rail and the second voltage rail is dissipated through the first switch and the second switch.

16 Claims, 2 Drawing Sheets

SYSTEMS AND METHODS FOR DISCHARGING BUS VOLTAGE USING SEMICONDUCTOR DEVICES

TECHNICAL FIELD

Embodiments of the subject matter described herein relate generally to electrical systems in automotive vehicles, and more particularly, embodiments of the subject matter relate to discharge circuits suitable for use in discharging high-voltage bus capacitance found in electric and hybrid vehicles.

BACKGROUND

In recent years, advances in technology, as well as ever evolving tastes in style, have led to substantial changes in the design of automobiles. One of the changes involves the power usage and complexity of the various electrical systems within automobiles, particularly alternative fuel vehicles, such as hybrid, electric, and fuel cell vehicles.

In most hybrid vehicles, energy storage devices, such as capacitors, are often used to improve efficiency by capturing energy within the powertrain system or supplying additional power during periods of operation when a primary energy source cannot supply the required power quickly enough. For example, regenerative braking may be used to capture energy by converting kinetic energy to electrical energy and storing the electrical energy in a bank of capacitors for later use. In order to accommodate high-voltage operation within automobiles, capacitor banks or supercapacitors are often used because they have the ability to quickly store energy and can be discharged at a much higher rate than other energy sources. However, capacitors may retain a charge after power is removed from a circuit or an automobile is turned off. Therefore, high-voltage capacitors should be properly discharged after turning off a vehicle or before accessing the equipment housing the capacitors.

Discharging a capacitor is typically accomplished by placing a discharge or bleed resistor across the capacitor or bus terminals in parallel. In addition to requiring additional components, these designs also require discharge resistors with the ability to handle high average power dissipation. These resistors generally occupy a larger surface area and often require additional harnesses, connectors, and heat sinks, which prevent the discharge resistors from being built on a circuit board. In addition to the increased spatial requirements, these discharge circuits are not utilized during normal operating modes.

BRIEF SUMMARY

In accordance with one embodiment, an electrical system is provided. The electrical system comprises a first switch coupled to a first voltage rail, a second switch coupled between the first switch and a second voltage rail, and a control system coupled to the first switch and the second switch. The control system is configured to alternately activate the first switch and the second switch such that an energy potential between the first voltage rail and the second voltage rail is dissipated through the first switch and the second switch.

In accordance with another embodiment, an electrical system for use in a vehicle is provided. The electrical system comprises a voltage bus, a capacitive element coupled to the voltage bus, an electric motor having one or more windings, and an inverter module coupled between the voltage bus and the electric motor. The inverter module includes one or more inverter phase legs, wherein each inverter phase leg corresponds to a respective winding of the electric motor. The electrical system further comprises a control system coupled to the inverter module, wherein the control system is configured to operate the one or more inverter phase legs to deliver power to the electric motor, and in response to a discharge condition, toggle at least one of the inverter phase legs to dissipate energy potential on the voltage bus.

In another embodiment, a method is provided for discharging an energy potential between a first conductive element and a second conductive element using an inverter module. The inverter module includes a first set of one or more switches coupled to the first conductive element and a second set of one or more switches coupled to the second conductive element. The method comprises identifying a discharge condition, and in response to the discharge condition, alternately dissipating the energy potential through the first set of switches or the second set of switches, wherein the first set of switches and the second set of switches do not dissipate energy simultaneously.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
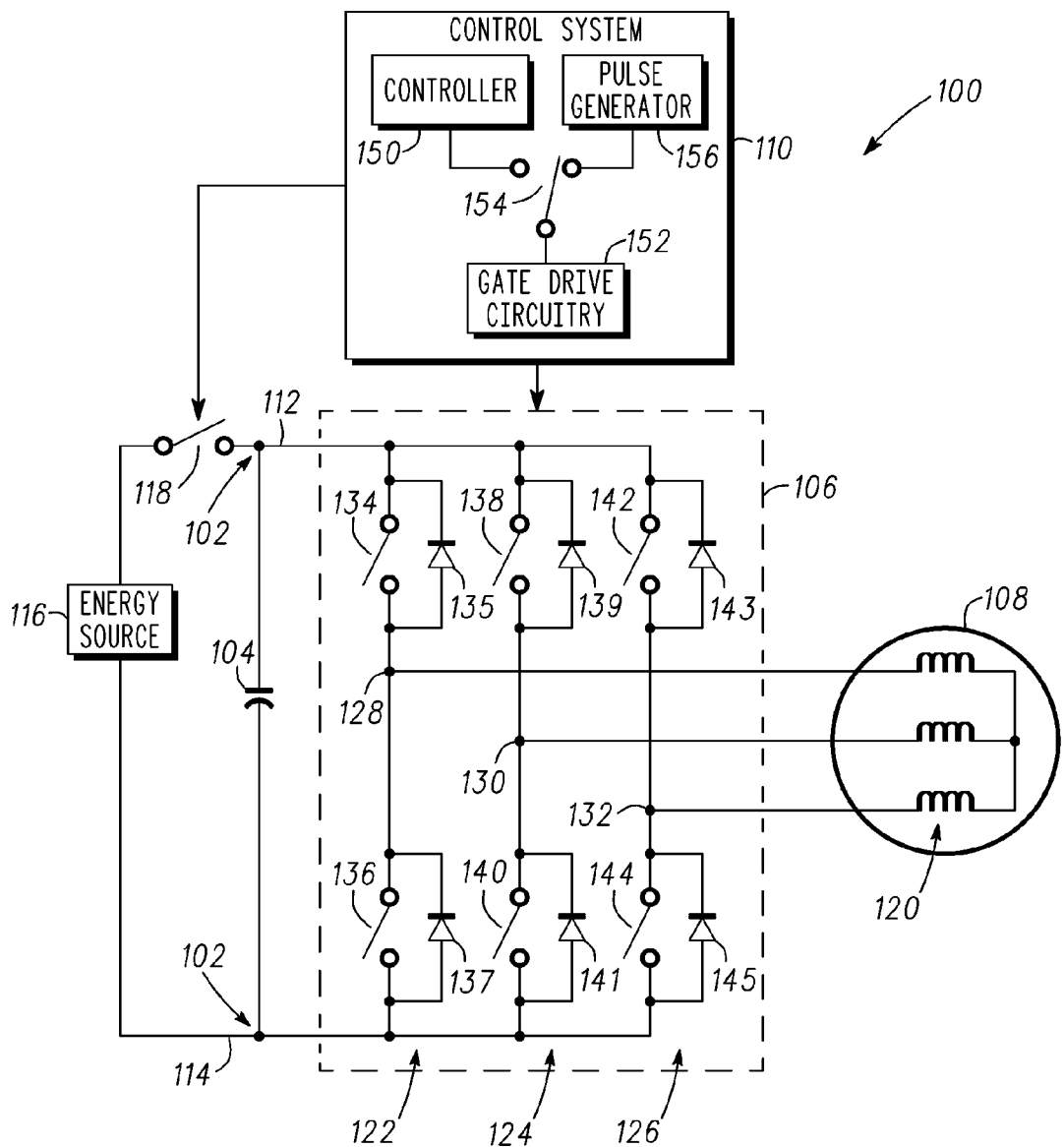
FIG. 1 is a schematic view of an electrical system suitable for use in a vehicle in accordance with one embodiment.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the figures may depict one exemplary arrangement of elements, additional intervening elements, devices, features, or components may be present in an embodiment of the depicted subject matter. In addition, certain terminology may also be used in the following description for the purpose of reference only, and thus is not intended to be limiting. The terms "first", "second" and other such numerical terms referring to structures do not imply a sequence or order unless clearly indicated by the context.

For the sake of brevity, conventional techniques related to electrical energy and/or power conversion, transistor-based switch control, pulse-width modulation (PWM), and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate generally to systems and methods for discharging high-voltages that exist in electric circuits, architectures, and systems, such as, for example, electric and hybrid vehicle drive systems. Various functionality and features of automotive drive systems are well known and so, in the interest of brevity, many conventional aspects will only be mentioned briefly herein or will be omitted entirely without providing the well known details.

FIG. 1 illustrates an electrical system 100 suitable for use in a vehicle, in accordance with one embodiment. The electrical system 100 includes, without limitation, a bus 102, a capacitive element 104, an inverter module 106, a motor 108, and a control system 110. The inverter module 106 is coupled between the bus 102 and the motor 108, and the inverter module 106 provides AC power to the motor 108 from the bus 102 under control of the control system 110, as described in greater detail below. It should be understood that FIG. 1 is a simplified representation of the electrical system 100 for purposes of explanation and ease of description, and FIG. 1 is not intended to limit the scope or applicability of the subject matter described herein in any way. Thus, although FIG. 1 depicts direct electrical connections between circuit elements and/or terminals, alternative embodiments may employ intervening circuit elements and/or components while functioning in a substantially similar manner.

In an exemplary embodiment, the bus 102 is realized as a pair of conductive elements, such as wires, cables, or busbars. In this regard, a first conductive element 112 of the bus 102 corresponds to a positive reference voltage and a second conductive element 114 corresponds to a negative reference voltage, wherein the difference between the positive reference voltage and the negative reference voltage is considered to be the voltage of the bus 102 (or alternatively, the bus voltage). Accordingly, for convenience, but without limitation, the first conductive element 112 may be referred to herein as the positive rail of the bus 102 and the second conductive element 114 may be referred to herein as the negative rail of the bus 102. In an exemplary embodiment, the bus 102 comprises a high-voltage bus having a bus voltage that may range from about 300 volts to about 500 volts or higher during normal operation of the electrical system 100.

In practice, the bus 102 is coupled to a direct current (DC) energy source 116 (e.g., a battery or battery pack, a fuel cell or fuel cell stack, a DC/DC converter output, or the like) via a suitably configured switching arrangement 118 (e.g., a contactor, relay, or the like). In this regard, when the switching arrangement 118 is closed, the DC energy source 116 provides DC voltage/current to the bus 102 which is converted to AC power by the inverter module 106 and provided to the motor 108. As shown, a capacitive element 104, such as a capacitor, is coupled between the positive rail 112 and the negative rail 114 of the bus 102 and interposed between the DC energy source 116 and the inverter module 106 to capture energy within the electrical system 100 or otherwise reduce voltage ripple on the bus 102, as will be appreciated in the art. In an exemplary embodiment, the switching arrangement 118 is opened to decouple the energy source and allow voltage stored on the capacitor 104 and/or elsewhere within the electrical system 100 to be discharged from the bus 102, as described in greater detail below.

In an exemplary embodiment, the motor 108 is realized as an electric motor, and depending on the embodiment, may be an induction motor, a permanent magnet motor, or another type of motor suitable for the desired application. Although not illustrated, the motor 108 may also include a transmission integrated therein such that the motor and the transmission are mechanically coupled to the drive shaft of a vehicle. As shown in FIG. 1, in an exemplary embodiment, the motor 108 comprises a multi-phase alternating current (AC) motor and includes a set of windings 120 (or coils), wherein each winding corresponds to a respective phase of the motor 108.

In an exemplary embodiment, the inverter module 106 includes an inverter having one or more phase legs 122, 124, 126 coupled between the positive rail 112 and the negative rail 114 of the bus 102. Each inverter phase leg 122, 124, 126 includes a pair of switches, each switch having a freewheeling diode associated therewith, and a respective output node between sets of switches and diodes, as shown and discussed in greater detail below. The output nodes 128, 130, 132 of the inverter phase legs are each electrically connected to a corresponding phase of the motor 108. In an exemplary embodiment, during normal motoring operation when the switching arrangement 118 is closed, the control system 110 provides pulse-width modulated (PWM) signals to operate (i.e., open and close) the switches of the phase legs 122, 124, 126 with desired timing and duty cycles to convert DC voltage from the bus 102 into desired AC voltage at the output nodes 128, 130, 132. As set forth above, the output nodes 128, 130, 132 are coupled to windings 120 to provide the AC voltage across the windings 120 and operate the motor 108, in a conventional manner.

In the illustrated embodiment of FIG. 1, the inverter module 106 and the motor 108 each have three-phases. However, it should be understood that the principles and subject matter discussed herein apply to a system with any number of phases, and may be modified accordingly as will be appreciated in the art. Thus, although the subject matter may be described herein in the context of a three-phase implementation, the subject matter is not limited to three-phase applications and may be utilized with inverters and/or motors having any number of phases.

As described above, each phase leg 122, 124, 126 of the inverter module 106 includes a pair of switches 134, 136, 138, 140, 142, 144 with a freewheeling diode 135, 137, 139, 141, 143, 145 coupled antiparallel to each switch. The switches 134, 136, 138, 140, 142, 144 and diodes 135, 137, 139, 141, 143, 145 are antiparallel, meaning they are electrically in parallel with reversed or inverse polarity. The antiparallel configuration allows for bidirectional current flow while blocking voltage unidirectionally, as will be appreciated in the art. In this configuration, the direction of current through the switches 134, 136, 138, 140, 142, 144 is opposite to the direction of allowable current through the respective diodes 135, 137, 139, 141, 143, 145. In an exemplary embodiment, the switches 134, 136, 138, 140, 142, 144 are realized as semiconductor devices, such as insulated gate bipolar transistors (IGBTs), field-effect transistors (e.g., MOSFETs), or another suitable semiconductor switching device.

In the illustrated embodiment of FIG. 1, a first phase leg 122 includes a first set of a switch 134 and diode 135 connected between the positive rail 112 and a first output node 128 and a second set of a switch 136 and diode 137 connected between the first output node 128 and the negative rail 114, wherein the first switch 134 is configured to allow current from the positive rail 112 to the first output node 128 and the second switch 136 is configured to allow current from the output node 128 to the negative rail 114. Similarly, a second phase leg 124 includes a switch 138 and diode 139 connected between the positive rail 112 and output node 130 and another switch 140 and diode 141 connected between output node 130 and the negative rail 114, and a third phase leg 126 includes a switch 142 and diode 143 connected between the positive rail 112 and output node 132 and another switch 144 and diode 145 connected between output node 132 and the negative rail 114. For convenience, the switches 134, 138, 142 coupled to the positive rail 112 may alternatively be referred to herein collectively as the positive set of switches (or positive switches) and the switches 136, 140, 144 coupled to the negative rail 114 may alternatively be referred to herein collectively as the negative set of switches (or negative switches).

The control system 110 generally represents the hardware, firmware and/or software (or a combination thereof) configured to modulate (open and/or close) the switches of the inverter module 106. In an exemplary embodiment, the control system 110 includes a controller 150, gate drive circuitry 152, a selection arrangement 154, and a pulse generator 156. As described in greater detail below, in an exemplary embodiment, the controller 150 and the pulse generator 156 are selectively coupled to the gate drive circuitry 152 via the selection arrangement 154 to either deliver power to the motor 108 or discharge the voltage bus 102.

The controller 150 generally represents the hardware, firmware and/or software (or a combination thereof) configured to achieve a desired power flow between the voltage bus 102 and the motor 108. In this regard, the controller 150 determines and/or generates control signals to modify the duty cycles and/or timing for the switches of the inverter phase legs 122, 124, 126 to control the voltage at the output nodes 128, 130, 132, as will be appreciated in the art. The controller 150 may be implemented or realized with a general purpose processor, a microprocessor, a microcontroller, a content addressable memory, a digital signal processor, an application specific integrated circuit, a field programmable gate array, any suitable programmable logic device, discrete gate or transistor logic, discrete hardware components, or any combination thereof, designed to support and/or perform the functions described herein.

The pulse generator 156 generally represents the hardware, firmware and/or software (or a combination thereof) configured to generate control signals to discharge the bus 102 by operating the phase legs of the inverter module 106. In an exemplary embodiment, the pulse generator 156 is configured to generate control signals which toggle the phase legs 122, 124, 126 of the inverter module 106. As used here, toggling a phase leg should be understood as alternating the phase leg between a first state in which the switch connected to the positive rail 112 (the positive switch of the inverter phase leg) conducts current (e.g., a closed or ON state) and the switch connected to the negative rail 114 (the negative switch of the inverter phase leg) does not conduct current (e.g., an open or OFF state), and a second state in which the switch connected to the positive rail 112 does not conduct current and the switch connected to the negative rail 114 conducts current. In this regard, the pulse generator 156 generates control signals that result in the inverter module 106 alternating between a first state where the positive switches 134, 138, 142 are closed (or turned ON) while the negative switches 136, 140, 144 are open (or turned OFF) and a second state where the positive switches 134, 138, 142 are open (or turned OFF) while the negative switches 136, 140, 144 are closed (or turned ON). In an exemplary embodiment, the phase legs 122, 124, 126 are toggled or otherwise alternated synchronously, such that the positive switches 134, 138, 142 are opened/closed in concert and the negative switches 136, 140, 144 are opened/closed in concert to avoid producing torque in the motor 108.

In an exemplary embodiment, the pulse generator 156 is configured to toggle the inverter phase legs 122, 124, 126 (i.e., alternate between states) at the highest frequency achievable based on the hardware components of the inverter module 106 and/or the gate drive circuitry 152. In this regard, in practical embodiments, the positive and negative switches of an inverter phase leg (e.g., switch 134 and switch 136 of inverter phase leg 122) should not be on simultaneously to prevent a shoot-through condition which may result an undesirably large amount of power being handled by the switches of the respective phase leg. Thus, in an exemplary embodiment, the inverter module 106 requires a dead time that corresponds to a minimum amount of time between opening one switch of the phase leg and closing the other switch of the phase leg to ensure that the switches are not on simultaneously, that is, the minimum amount of time required to ensure the switch that was previously closed or in an ON state stops conducting current (e.g., by returning to an open or OFF state) before the other switch of the phase leg begins conducting current. In this regard, in an exemplary embodiment, the pulse generator 156 generates command signals that result in a first voltage pulse being applied to a control terminal (e.g., the gate terminal) of a first switch of a phase leg (e.g., switch 134), followed by a dead time where no voltage is applied to either switch of the phase leg (i.e., neither switch of the phase leg conducts current), followed by a second voltage pulse applied to a control terminal of a second switch of the phase leg (e.g., switch 136), followed by a second dead time where neither switch of the phase leg conducts current.

Figure 2:
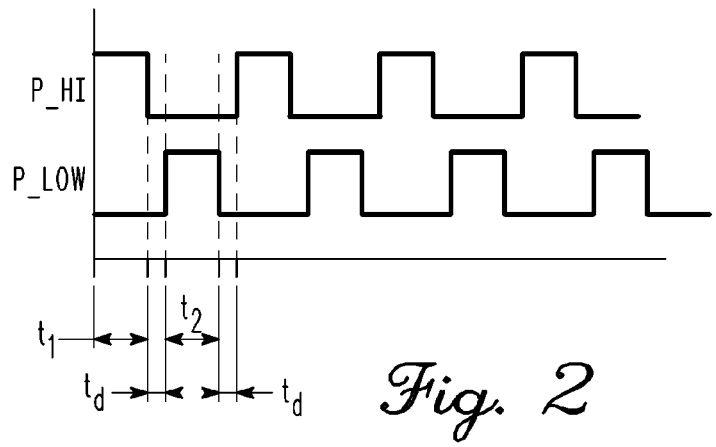
FIG. 2 illustrates a timing diagram for operating switching elements of one or more inverter phase legs to discharge a bus voltage in the electrical system of FIG. 1 in accordance with one embodiment.

For example, as shown in FIG. 2, in an exemplary embodiment, the pulse generator 156 generates command signals that result in a first voltage pulse having a duration, $t_1$, being applied to a control terminal of a first switch of a phase leg (e.g., switch 134). In this regard, the voltage of the first voltage pulse is greater than the threshold voltage for the first switch and the duration of the first voltage pulse ($t_1$) is greater than or equal to the minimum amount of time required for the first switch to transition from an open state (or OFF state), where the first switch does not conduct current, to a closed state (or ON state). As shown, no voltage (or a voltage less than the threshold voltage) is applied to the second switch of the phase leg (e.g., switch 136) such that the second switch does not conduct current. In an exemplary embodiment, the first voltage pulse is followed by a dead time, $t_d$, where no voltage is applied to either switch of the phase leg. In this regard, the dead time corresponds to the minimum amount of time required for the first switch to transition from a closed (or ON) state to an open (or OFF) state where the first switch no longer conducts current. After the dead time, a second voltage pulse having a duration, $t_2$, is applied to a control terminal of the second switch of the phase leg. The voltage of the second voltage pulse is greater than the threshold voltage for the second switch and the duration of the second voltage pulse ($t_2$) is greater than or equal to the minimum amount of time required for the second switch to transition from an open state (or OFF state), where the second switch does not conduct current, to a closed state (or ON state). In an exemplary embodiment, the switches of the inverter phase leg comprise identical components, such that the durations of the first and the second voltage pulses are equal (e.g., $t_1=t_2$). In an exemplary embodiment, the second voltage pulse is followed by another dead time, $t_d$, where no voltage is applied to either switch of the phase leg, before repeating the steps of applying a voltage pulse to the first switch, waiting for a dead time, applying a voltage pulse to the second switch, waiting for another dead time, and so on, to alternately dissipate the energy potential of the bus 102 through the switches, as described in greater detail below. Thus, the switching period (i.e., the inverse of the switching frequency) for toggling an inverter phase leg corresponds to the sum of the duration of the first and second pulses plus two dead times.

In an exemplary embodiment, the duration of the voltage pulses ($t_1$, $t_2$) is equal to the minimum amount of time required for the switches 134, 136, 138, 140, 142, 144 to transition from an open state (or OFF state) to a closed state (or ON state). By minimizing the duration of the voltage pulses, the switching frequency is maximized (or the switching period minimized), thereby reducing the amount of time required to discharge the voltage bus 112. Furthermore, the amount of time during which the switches 134, 136, 138, 140, 142, 144 conduct current is reduced, thereby limiting the stress on the switches 134, 136, 138, 140, 142, 144. In an exemplary embodiment, the pulse generator 156 is configured to repeat the switching period for an extended period of time to toggle the switches of the inverter phase legs until the voltage of the bus 102 is sufficiently discharged, as described in greater detail below.

Referring again to FIG. 1, the controller 150 and the pulse generator 156 are each coupled to the gate drive circuitry 152 via the selection arrangement 154, wherein the selection arrangement 154, wherein the selection arrangement 154 generally represents the hardware, firmware and/or software (or a combination thereof) operable to control which of the controller 150 and pulse generator 156 is coupled to the gate drive circuitry 152. The gate drive circuitry 152 generally represents the hardware (e.g., amplifiers, current buffers, voltage level translation circuitry, opto-isolators, gate drivers, and the like) configured to employ high frequency pulse-width modulation (PWM) to modulate (open and/or close) the switches of the inverter module 106. In this regard, the gate drive circuitry 152 is coupled to the control terminal (or gate terminal) of each of the switches 134, 136, 138, 140, 142, 144 and is configured to employ high frequency pulse-width modulation (PWM) in response to control signals received from either the controller 150 or the pulse generator 156 via the selection arrangement 154.

In an exemplary embodiment, the controller 150 and/or control system 110 is configured to detect a discharge condition and operate the selection arrangement 154 to couple the pulse generator 156 to the gate drive circuitry 152 in response to detecting a discharge condition. As used herein, a discharge condition should be understood as a situation where it is desirable to discharge a voltage that may be stored within an electrical system (e.g., by capacitor 104 or another element coupled to the bus 102) to protect against electrostatic discharge or other negative effects. For example, a discharge condition may be an attempt to access a unit or compartment containing a high-voltage component, a vehicle crash or accident, or turning off of a vehicle housing the electrical system. Although not illustrated, the controller 150 and/or control system 110 may be configured to detect the discharge condition using one or more sensors or receive an input signal indicative of a discharge condition from another vehicle module, such as an electronic control unit. As described below, in the discharge mode, the control system 110 operates the inverter module 106 to dissipate the energy potential between the voltage rails 112, 114 to a safe level within a specified period of time by toggling the inverter phase legs 122, 124, 126.

It should be noted that, although FIG. 1 depicts the pulse generator 156 and controller 150 as separate and distinct elements, in some practical embodiments, the features and/or functionality of the pulse generator 156 may be implemented by controller 150, and in such embodiments, the pulse generator 156 and selection arrangement 154 need not be present. In accordance with one embodiment, in response to a discharge condition, the controller 150 is configured to set the duty cycle for both the positive set of switches 134, 138, 142 and the negative set of switches 136, 140, 144 to fifty percent (then accounting for dead times) at the maximum switching frequency achievable by the control system 110. For example, if the maximum switching frequency of the control system 110 is 30 kHz and the required dead time is 2 microseconds, the controller 150 generates control signals that result in the gate drive circuitry 152 applying a first voltage pulse to the positive set of switches 134, 138, 142 with a duration of 14.5 microseconds and, after a 2 microsecond dead time, a second voltage pulse applied to the negative set of switches 136, 140, 144 with a duration of 14.5 microseconds.

Figure 3:
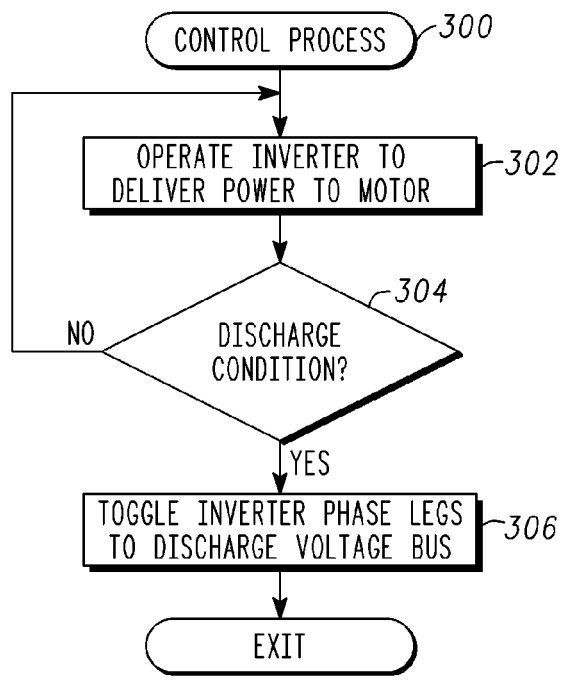
FIG. 3 is a flow diagram of control process suitable for use with the electrical system of FIG. 1 in accordance with one embodiment.

Referring now to FIG. 3, in an exemplary embodiment, an electrical system may be configured to perform a control process 300 and additional tasks, functions, and operations described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the inverter module 106, the control system 110, the controller 150, the pulse generator 156 and/or the gate drive circuitry 152. It should be appreciated that any number of additional or alternative tasks may be included, and may be incorporated into a more comprehensive procedure or process having additional functionality not described in detail herein.

Referring to FIG. 3, and with continued reference to FIG. 1 and FIG. 2, a control process 300 may be performed to discharge a voltage bus (e.g., bus 102) without requiring additional hardware components dedicated to discharging the voltage. In an exemplary embodiment, the control process 300 begins by operating an inverter module to deliver power (or current) to/from a motor in the vehicle (task 302). In this regard, the controller 150 determines or otherwise generates signals to control the duty cycles of the switches of the inverter module 106 (i.e., the amount of time a respective switch is closed or open) as well as the timing for operating the switches (i.e., when a switch is closed or open). The selection arrangement 154 is initially configured such that the controller 150 is coupled to the gate drive circuitry 152 such that in response to the control signals from the controller 150, the gate drive circuitry 152 produces PWM signals that operate the switches of the inverter module 106 with the appropriate duty cycles and timing to achieve a desired power flow to/from the motor 108. In an exemplary embodiment, the control process 300 continues by determining whether a discharge condition exists or has occurred (task 304). In this regard, the control system 110 and/or controller 150 monitors the electrical system 100 for a situation where it is desirable to discharge a voltage on the bus 102 or otherwise stored by the capacitor 104, as described above. In accordance with one embodiment, the control system 110 coupled to the switching arrangement 118 and opens the switching arrangement 118 to decouple the energy source 116 from the bus in response to identifying the discharge condition.

In an exemplary embodiment, in response to detecting or otherwise identifying a discharge condition, the control process 300 continues by operating the inverter module by toggling the inverter phase legs to discharge the voltage bus (task 306). In this regard, the control system 110 is configured to toggle at least one of the phase legs 122, 124, 126 of the inverter module 106 to dissipate the voltage of the bus 102 and/or capacitor 104. In an exemplary embodiment, all of the inverter phase legs 122, 124, 126 are toggled synchronously to alternately activate (e.g., close or turn ON) either the positive switches 134, 138, 142 or the negative switches 136, 140, 144 in concert to alternately dissipate the energy potential of the bus 102 through either the positive switches 134, 138, 142 or the negative switches 136, 140, 144 while preventing production of torque in the motor 108. The inverter phase legs are toggled or otherwise alternated between states to discharge (or dissipate) the voltage of the bus 102 to a desired level.

For example, in accordance with one or more embodiments, in response to identifying a discharge condition, the controller 150 may activate the selection arrangement 154 to couple the pulse generator 156 to the gate drive circuitry 152 to toggle the inverter phase legs. The pulse generator 156 generates command signals that cause the gate drive circuitry 152 to apply a voltage pulse to the control terminals (e.g., gate terminals) of the positive switches 134, 138, 142 with sufficient duration to cause the positive switches 134, 138, 142 to close or turn ON while maintaining the negative switches 136, 140, 144 in an open or OFF state. In an exemplary embodiment, voltage pulses having the same duration and timing are applied to the gate terminals of the positive switches 134, 138, 142, such that the positive switches 134, 138, 142 are concurrently in the closed or ON state (e.g., at the same time for the same duration). When the positive switches 134, 138, 142 transition from an open to closed state, current from the bus 102 flows through the switches 134, 138, 142, thereby driving the outputs 128, 130, 132 (with their associated parasitic capacitances) to the positive rail voltage and dissipating some of the voltage of the bus 102. By closing the positive switches 134, 138, 142 synchronously and/or concurrently, the voltage at the output nodes 128, 130, 132, and thus, the voltage applied to the phases of the motor windings 120 are substantially equal (e.g., within realistic and/or practical operating tolerances for the voltage drop across each switch) such that substantially zero torque is produced in the motor 108. The command signals provided by the pulse generator 156 cause the gate drive circuitry 152 to subsequently remove the voltage pulses from the positive switches 134, 138, 142 for a dead time interval to allow the switches 134, 138, 142 to stop conducting current (e.g., but returning to an open or OFF state). After the dead time interval, the command signals cause the gate drive circuitry 152 to apply a voltage pulse to the control terminals (e.g., gate terminals) of the negative switches 136, 140, 144 with sufficient duration to cause the negative switches 136, 140, 144 to close or turn ON while maintaining the positive switches 134, 138, 142 in an open or OFF state. When the negative switches 136, 140, 144 transition from an open to closed state, current from the bus 102 flows through the negative switches 136, 140, 144 to drive output nodes 128, 130, 132 to the negative rail voltage, further dissipating the voltage of the bus 102. As set forth above, the command signals are repeated to toggle or otherwise alternate the inverter phase legs between states to discharge (or dissipate) the voltage of the bus 102 to a desired level. In an exemplary embodiment, the inverter phase legs 122, 124, 126 are toggled until the voltage of the bus 102 is discharged to a voltage less than or equal to 60 Volts.

To briefly summarize, advantages of the system and/or method described above is that the high-voltage bus may be discharged without requiring additional discharge components, such as discharge resistors or relays. Furthermore, the bus may be discharged in a manner that allows for a fast discharge of the bus while also minimizing the power absorption or stress on the semiconductor devices. As described above, the inverter phase legs are toggled as fast as possible to achieve rapid discharge while accounting for dead time and minimizing the amount of time the switches of the inverter phase legs are conducting current. Additionally, the systems and methods described above may be utilized in different types of automobiles, different vehicles (e.g., watercraft and aircraft), or in other electrical systems altogether, as it may be implemented in any situation where a high-voltage bus needs to be reliably discharged.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An electrical system comprising:
a first switch coupled to a first voltage rail;

a second switch coupled between the first switch and a second voltage rail; and a control system coupled to the first switch and the second switch, wherein the control system is configured to alternately activate the first switch and the second switch such that an energy potential between the first voltage rail and the second voltage rail is alternately dissipated through the first switch or the second switch by:

applying a first voltage pulse to the first switch, the first voltage pulse having a first duration greater than or equal to a minimum amount of time required for the first switch to transition from an OFF state to an ON state, wherein the second switch is in an OFF state while the first voltage pulse is applied;

applying a second voltage pulse having a second duration to the second switch a first dead time after applying the first voltage pulse to the first switch, the second duration being greater than or equal to a minimum amount of time required for the second switch to transition from an OFF state to an ON state and the first dead time corresponding to an amount of time required for the first switch to transition from an ON state to an OFF state, such that the first switch is in an OFF state while the second voltage pulse is applied;

applying a third voltage pulse having the first duration to the first switch a second dead time after applying the second voltage pulse to the second switch, the second dead time corresponding to an amount of time required for the second switch to transition from an ON state to an OFF state such that the second switch is in an OFF state while the third voltage pulse is applied; and applying a fourth voltage pulse having the second duration to the second switch the first dead time after applying the third voltage pulse to the first switch such that the first switch is in an OFF state while the fourth voltage pulse is applied.

2. The electrical system of claim 1, further comprising:
a third switch coupled to the first voltage rail; and
a fourth switch coupled between the third switch and the second voltage rail, wherein the control system is coupled to the third switch and the fourth switch, wherein:
the control system is configured to alternately activate the third switch for the first duration and the fourth switch for the second duration such that the energy potential is dissipated through the third switch and the fourth switch;
the third switch and the first switch are activated synchronously; and
the fourth switch and the second switch are activated synchronously.

3. The electrical system of claim 2, wherein:
each of the first switch, the second switch, the third switch, and the fourth switch comprises a transistor; and
the control system is configured to:
apply a fifth voltage pulse having the first duration to the third switch concurrently with the first voltage pulse, wherein the fourth switch does not conduct current while the fifth voltage pulse is applied; and
apply a sixth voltage pulse having the second duration to the fourth switch concurrently with the second voltage pulse, wherein the third switch does not conduct current while the fourth voltage pulse is applied.

4. The electrical system of claim 1, wherein the control system is configured to identify a discharge condition, wherein the control system alternately activates the first switch and the second switch in response to the discharge condition.

5. The electrical system of claim 4, further comprising:
a bus comprising the first voltage rail and the second voltage rail;
an energy source; and
a switching arrangement coupled between the bus and the energy source, wherein the control system is configured to open the switching arrangement to decouple the energy source from the bus in response to identifying the discharge condition.

6. The electrical system of claim 1, further comprising:
a motor having a first winding coupled between the first switch and the second switch, wherein the control system comprises:
a controller configured to generate first command signals to operate the first switch and the second switch to deliver power to the motor;
a pulse generator configured to generate second command signals to toggle the first switch and the second switch to discharge the energy potential; and
gate drive circuitry configured to apply voltages to the first switch and the second switch to operate the first switch and the second switch, wherein:
the gate drive circuitry is initially coupled to the controller such that the gate drive circuitry applies voltages to the first switch and the second switch in accordance with the first command signals to operate the motor; and
in response to a discharge condition, the gate drive circuitry is coupled to the pulse generator, such that the gate drive circuitry applies voltages to the first switch and the second switch in accordance with the second command signals to alternately activate the first switch and the second switch such that the energy potential is dissipated.

7. The electrical system of claim 1, wherein the first duration and the second duration are equal to a minimum amount of time required for the first switch and the second switch to transition from an open state to a closed state.

8. The electrical system of claim 1, wherein the control system alternately activates the first switch and the second switch over a switching period corresponding to a sum of the first duration, the first dead time, the second duration, and the second dead time.

9. The electrical system of claim 1, wherein the first switch and the second switch do not conduct current simultaneously.

10. A method for discharging an energy potential between a first conductive element and a second conductive element using an inverter module coupled to the first conductive element and the second conductive element, the inverter module including a first set of a plurality of switches coupled between the first conductive element and a motor and a second set of a plurality of switches coupled between the second conductive element and the motor, the method comprising:
identifying a discharge condition; and
in response to the discharge condition, alternately dissipating the energy potential through the first set of switches or the second set of switches by alternately activating the first set of switches for a first duration a second dead time after activating the second set of switches and activating the second set of switches for a second duration a first dead time after activating the first set of switches, the first dead time corresponding to a first amount of time required for the first set of switches to transition from a closed state to an open state and the second dead time corresponding to a second amount of time required for the second set of switches to transition from a closed state to an open state, wherein the first set of switches and the second set of switches do not dissipate energy simultaneously.

11. The method of claim 10, the inverter module including a plurality of phase legs, each phase leg comprising a first switch of the first set of switches and a second switch of the second set of switches, the second switch being configured between the first switch and the second conductive element, wherein alternately dissipating the energy potential comprises toggling the plurality of phase legs in concert.

12. The method of claim 10, wherein alternately dissipating the energy potential through the first set of switches or the second set of switches comprises alternating between applying voltage to control terminals of the first set of switches and applying voltage to control terminals of the second set of switches.

13. The method of claim 10, wherein alternately dissipating the energy potential through the first set of switches or the second set of switches comprises:
   closing the first set of switches, wherein the second set of switches do not conduct current while the first set of switches are closed; and
   closing the second set of switches after closing the first set of switches, wherein the first set of switches do not conduct current while the second set of switches are closed.

14. The method of claim 13, wherein:
   closing the first set of switches comprises applying voltage to control terminals of the first set of switches for the first duration equal to an amount of time required to close the first set of switches; and
   closing the second set of switches comprises, the first dead time after applying voltage to the first set of switches, applying voltage to control terminals of the second set of switches for the second duration equal to an amount of time required to close the second set of switches, the first dead time corresponding to an amount of time required for the first set of switches to stop conducting current after applying voltage to the first set of switches.

15. The method of claim 14, wherein alternately dissipating the energy potential comprises repeating the steps of:
   applying voltage to control terminals of the first set of switches for the first duration the second dead time after applying voltage to the second set of switches, the second dead time corresponding to an amount of time required for the second set of switches to stop conducting current after applying voltage to the second set of switches; and
   applying voltage to control terminals of the second set of switches for the second duration the first dead time after applying voltage to the first set of switches.

16. An electrical system comprising:
   a first switch coupled to a first voltage rail;
   a second switch coupled between the first switch and a second voltage rail;
   a third switch coupled to the first voltage rail;
   a fourth switch coupled between the third switch and the second voltage rail; and
   a control system coupled to the first switch and the second switch, wherein the control system is configured to:
      alternately activate the first switch and the second switch such that an energy potential between the first voltage rail and the second voltage rail is dissipated through the first switch and the second switch; and
      alternately activate the third switch and the fourth switch such that the energy potential is dissipated through the third switch and the fourth switch, wherein:
         the third switch and the first switch are activated synchronously;
         the fourth switch and the second switch are activated synchronously;
         the first switch and the third switch are activated for a first duration a second dead time after activating the second switch and the fourth switch, the second dead time corresponding to an amount of time required for the second switch and the fourth switch to transition from a closed state to an open state; and
         the second switch and the fourth switch are activated for a second duration a first dead time after activating the first switch and the third switch, the first dead time corresponding to an amount of time required for the first switch and the third switch to transition from a closed state to an open state.

* * * * *